United States Patent
Sharma

(10) Patent No.: US 12,333,895 B2
(45) Date of Patent: *Jun. 17, 2025

(54) SYSTEMS AND METHODS FOR EVALUATING A JACKPOT USING A VALUE CAP

(71) Applicant: Aristocrat Technologies, Inc., Las Vegas, NV (US)

(72) Inventor: Rajneesh Sharma, Las Vegas, NV (US)

(73) Assignee: Aristocrat Technologies, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 18/341,556

(22) Filed: Jun. 26, 2023

(65) Prior Publication Data
US 2023/0351844 A1    Nov. 2, 2023

Related U.S. Application Data

(63) Continuation of application No. 17/748,126, filed on May 19, 2022, now Pat. No. 11,734,998, which is a
(Continued)

(51) Int. Cl.
*G07F 17/32*   (2006.01)
*G06F 7/58*    (2006.01)

(52) U.S. Cl.
CPC ......... *G07F 17/3227* (2013.01); *G06F 7/588* (2013.01); *G07F 17/3204* (2013.01); *G07F 17/3232* (2013.01); *G07F 17/3258* (2013.01); *G07F 17/3262* (2013.01); *G07F 17/3267* (2013.01); *G07F 17/3269* (2013.01)

(58) Field of Classification Search
None
See application file for complete search history.

(56) References Cited

U.S. PATENT DOCUMENTS 6,217,448 B1   4/2001  Olsen
6,712,695 B2   3/2004  Mothwurf
(Continued)

OTHER PUBLICATIONS

Office Action dated Apr. 6, 2021 for U.S. Appl. No. 16/833,003 (pp. 1-9).
(Continued)

*Primary Examiner* — Jason T Yen
(74) *Attorney, Agent, or Firm* — Armstrong Teasdale LLP

(57) ABSTRACT

A gaming system for evaluating a jackpot using a time cap is provided. The system includes a processor and a memory, wherein the processor is configured to execute instructions stored in the memory which when executed, cause the processor to at least store, in the memory, a jackpot including time cap parameters and a value of the jackpot. The instructions, when executed, further cause the processor to select a time cap based on the time cap parameters. The instructions, when executed, further cause the processor to determine, in response to a game instance, that the selected time cap has been reached. The instructions, when executed, further cause the processor to credit, in response to the determination, the value of the progressive jackpot to a player credit balance.

17 Claims, 6 Drawing Sheets

Related U.S. Application Data continuation of application No. 16/833,003, filed on Mar. 27, 2020, now Pat. No. 11,361,618.

(60) Provisional application No. 62/955,592, filed on Dec. 31, 2019.

(56) References Cited

U.S. PATENT DOCUMENTS

| | | | |
|---|---|---|---|
| 7,553,234 | B2 | 6/2009 | Walker |
| 7,674,180 | B2 | 3/2010 | Graham |
| 2008/0039194 | A1* | 2/2008 | Walther .................. G07F 17/32 463/25 |
| 2008/0090653 | A1* | 4/2008 | Kuehling ................ G07F 17/32 463/29 |
| 2009/0093299 | A1* | 4/2009 | Acres .................. G07F 17/3227 463/20 |
| 2011/0118011 | A1* | 5/2011 | Filipour ............. G07F 17/3267 463/30 |
| 2011/0124408 | A1* | 5/2011 | Ward ................. G07F 17/3269 463/27 |
| 2013/0252720 | A1* | 9/2013 | Milligan .................. A63F 9/24 463/27 |
| 2014/0066187 | A1 | 3/2014 | Saffari |
| 2015/0011290 | A1 | 1/2015 | Galansky |
| 2016/0314657 | A1 | 10/2016 | Buchholz |
| 2018/0033237 | A1* | 2/2018 | Osmond ............. G07F 17/3258 |
| 2018/0130310 | A1* | 5/2018 | Berman ............. G07F 17/3213 |
| 2019/0197835 | A1* | 6/2019 | Keilwert ............. G07F 17/3272 |
| 2020/0020199 | A1* | 1/2020 | Higgins ............. G06Q 30/0226 |

OTHER PUBLICATIONS

Office Action (Final Rejection) dated Oct. 13, 2021 for U.S. Appl. No. 16/833,003 (pp. 1-12).

Office Action (Notice of Allowance and Fees Due (PTOL-85)) dated Feb. 14, 2022 for U.S. Appl. No. 16/833,003 (pp. 1-8).

Office Action (Non-Final Rejection) dated Jan. 5, 2023 for U.S. Appl. No. 17/748,126 (pp. 1-6).

Office Action (Notice of Allowance and Fees Due (PTOL-85)) dated Apr. 7, 2023 for U.S. Appl. No. 17/748,126 (pp. 1-8).

* cited by examiner

SYSTEMS AND METHODS FOR EVALUATING A JACKPOT USING A VALUE CAP

CROSS-REFERENCE TO RELATED APPLICATIONS

This application is a continuation of U.S. patent application Ser. No. 17/748,126, filed May 19, 2022, which is a continuation of U.S. patent application Ser. No. 16/833,003, filed Mar. 27, 2020, which claims the benefit of priority to U.S. Provisional Patent Application No. 62/955,592, filed Dec. 31, 2019, the contents and disclosures of which are hereby incorporated by reference in their entirety.

TECHNICAL FIELD

The field of disclosure relates generally to electronic gaming, and more particularly to electronic gaming systems and methods for evaluating a progressive jackpot using a time cap.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

A gaming system for evaluating a jackpot using a time cap is provided. The system includes a processor and a memory, wherein the processor is configured to execute instructions stored in the memory which when executed, cause the processor to at least store, in the memory, a jackpot including time cap parameters and a value of the jackpot. The instructions, when executed, further cause the processor to select a time cap based on the time cap parameters. The instructions, when executed, further cause the processor to determine, in response to a game instance, that the selected time cap has been reached. The instructions, when executed, further cause the processor to credit, in response to the determination, the value of the progressive jackpot to a player credit balance.

DETAILED DESCRIPTION

The systems and methods described herein provide a mechanism for implementing a jackpot, such as a mystery value progressive jackpot, having a time cap. A mystery value progressive jackpot is a progressive jackpot that may be awarded when a value accumulated in response to player wagers rises above a threshold value and may be automatically awarded when the accumulated value reaches a mystery value. In the example embodiment, when the accumulated progressive jackpot is greater than the value threshold, the progressive jackpot may be awarded based on, for example, a random number generator (RNG) outcome, and when a jackpot value that is equal to the mystery value, the jackpot value may be automatically awarded. In the example embodiment, if the progressive jackpot value threshold is not reached before a time cap is reached, the jackpot value may be automatically awarded. The time cap may be selected, for example, from within a range of time (sometimes referred to herein as a "time cap range") specified by parameters of the progressive jackpot (sometimes referred to herein as "time cap parameters"). In the example embodiment, when a time duration from initiation of the jackpot and/or the current time (e.g., a clock or calendar time) reaches a time threshold, the progressive jackpot may be awarded based on the outcome of, for example, the RNG, and when the time duration reaches the cap time, the progressive jackpot may automatically be awarded. As such, the jackpot may be awarded at a frequency desired by an operator of the progressive jackpot regardless of the rate at which the progressive jackpot accumulates. In some embodiments, the mystery value progressive jackpot may be a multi-tier progressive jackpot, and each tier of the multi-tier progressive jackpot may have a corresponding mystery value and time cap. Additionally, or alternatively, the time cap may be implemented for another type of jackpot awarded by an EGM such as, for example, a fixed sum, a state-dependent amount (e.g., dependent on a range of accumulated wagers), and/or another prize (e.g., a vehicle or a travel vacation).

The systems and methods described herein therefore embody a variety of different technical effects, such as, for example: (a) a data structure for a gaming system that includes time cap parameters that enable a jackpot to be awarded based on a current timestamp and a selected time cap; and (b) a data structure for a gaming system that includes an RNG and a pay table, and that causes a jackpot to automatically be awarded upon a time cap being reached independent of a rate of player wagers.

Figure 1:
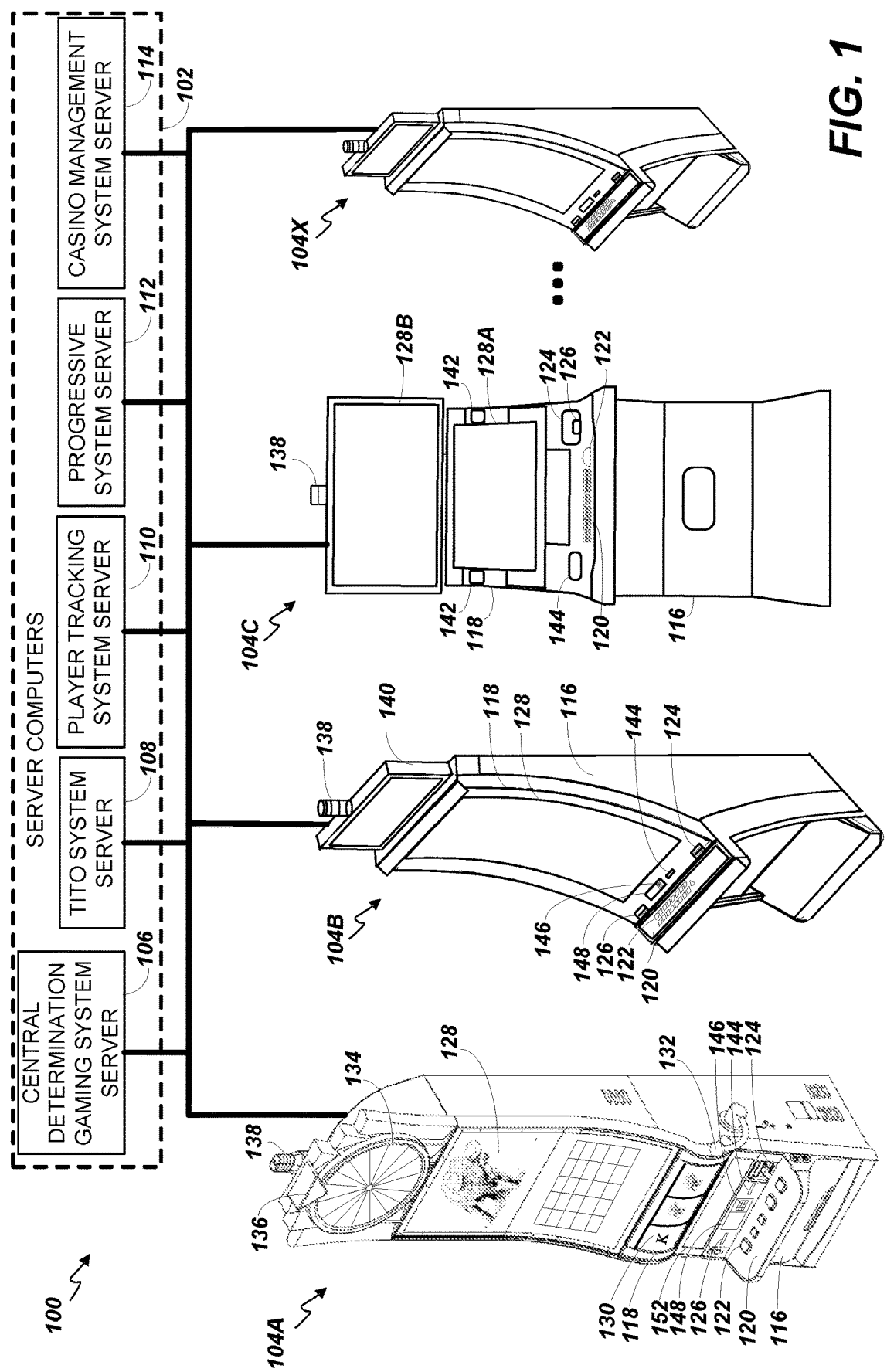
FIG. 1 is an exemplary diagram showing several EGMs networked with various gaming related servers in accordance with the present disclosure.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Reim XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
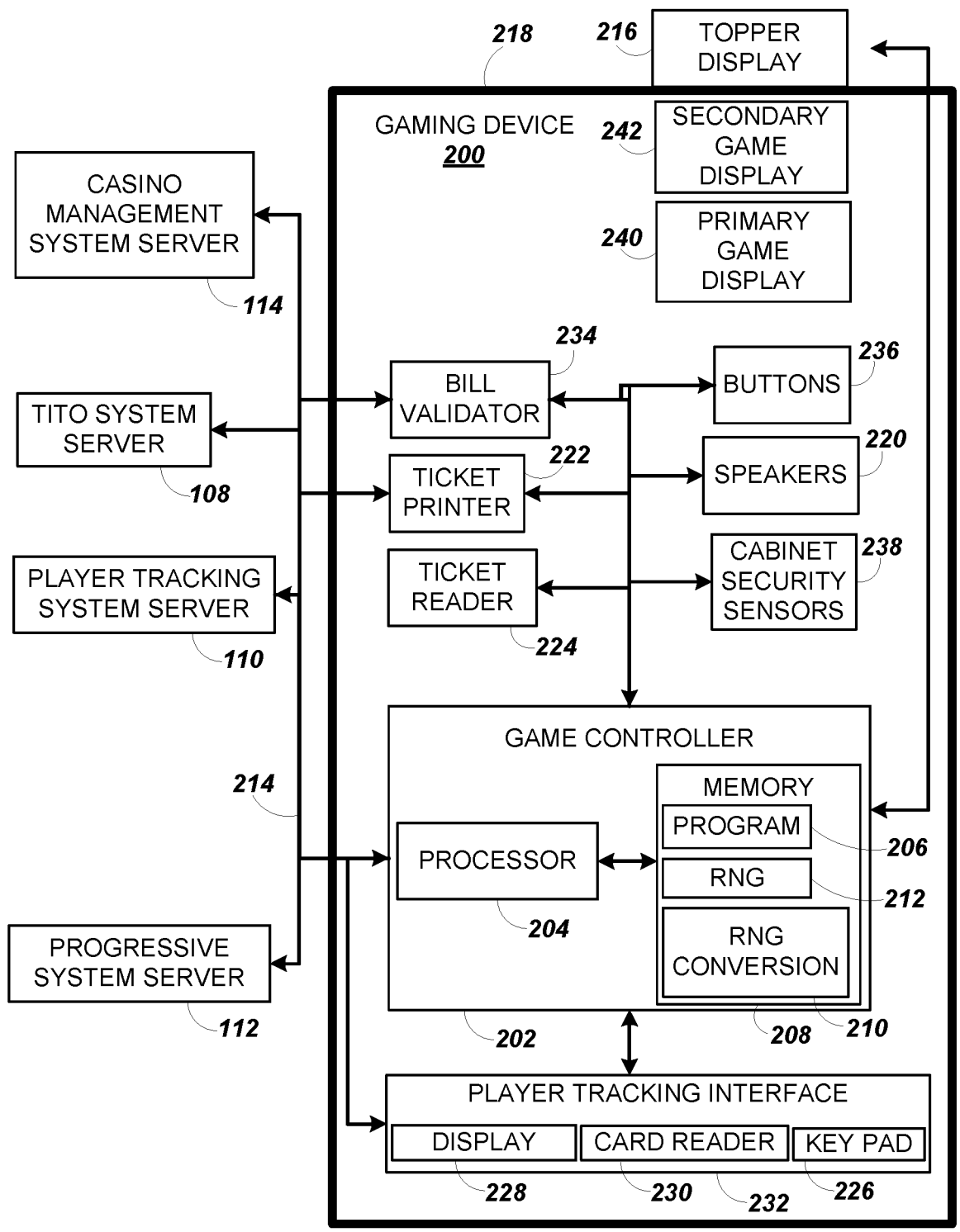
FIG. 2 is a block diagram showing various functional elements of an exemplary EGM in accordance with the present disclosure.

Many or all the above described components can be controlled by circuitry (e.g., a game controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that does retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EE-PROM), or other like memory device. Even though FIG. 2 illustrates that game controller 202 includes a single memory 208, game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS ° system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 3:
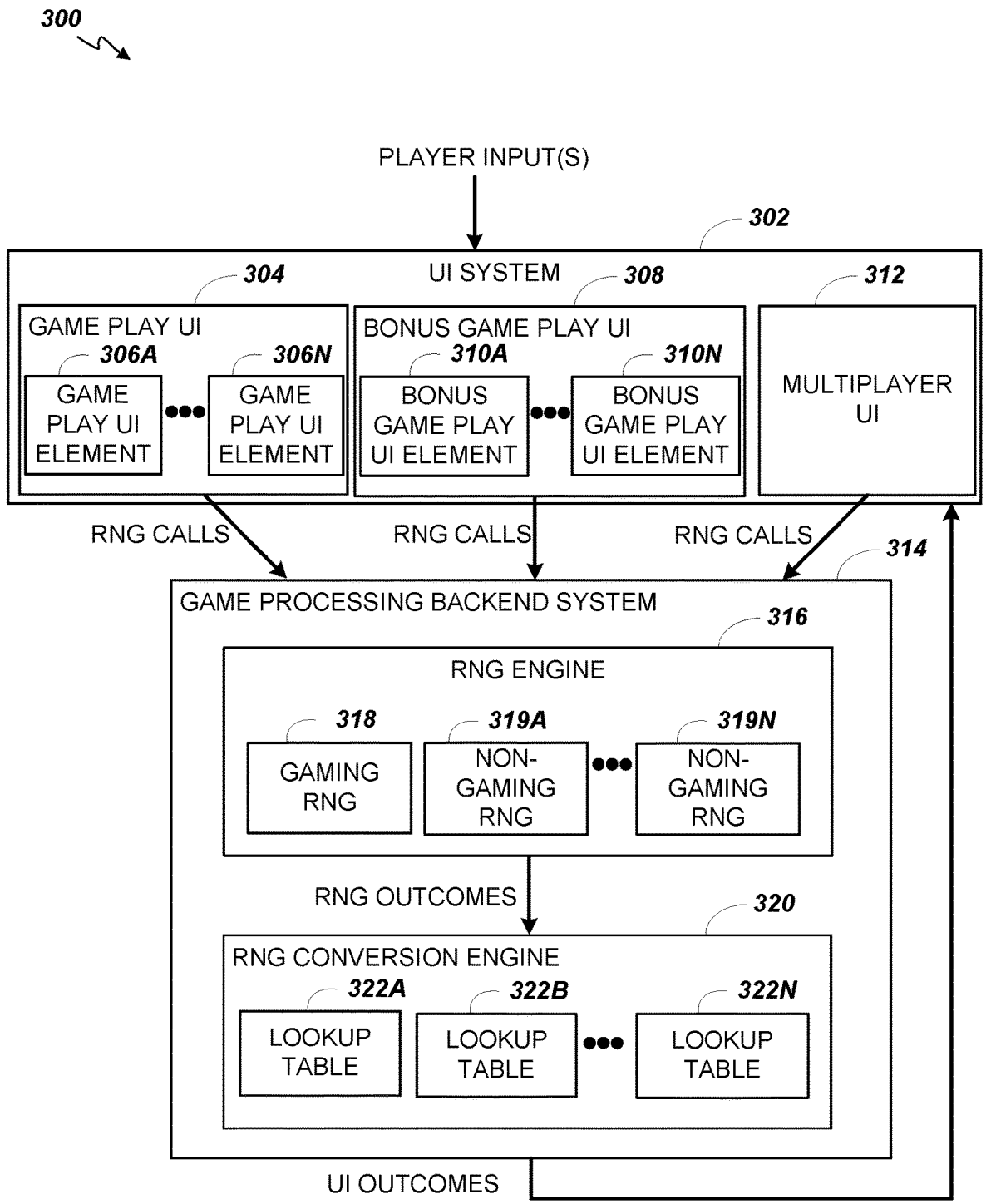
FIG. 3 illustrates, in block diagram form, an embodiment of a game processing architecture algorithm that implements a game processing pipeline for the play of a game in accordance with various embodiments of the present disclosure.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI elements 306A-306N are similar to the bonus game play UI elements 310A-310N. In other embodiments, the game play UI element 306A-306N can differ from the bonus game play UI elements 310A-310N.

FIG. 3 also illustrates that UI system 302 could include a multiplayer UI 312 purposed for game play that differ or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS).

Alternatively, non-gaming RNGs 319A-319N may not be cryptographically secure and/or be computationally less expensive. Non-gaming RNGS 319A-319N can, thus, be used to generate outcomes for non-gaming purposes. As an example, non-gaming RNGs 319A-319N can generate random numbers for such as generating random messages that appear on the gaming device.

The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game (e.g., a progressive jackpot), the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
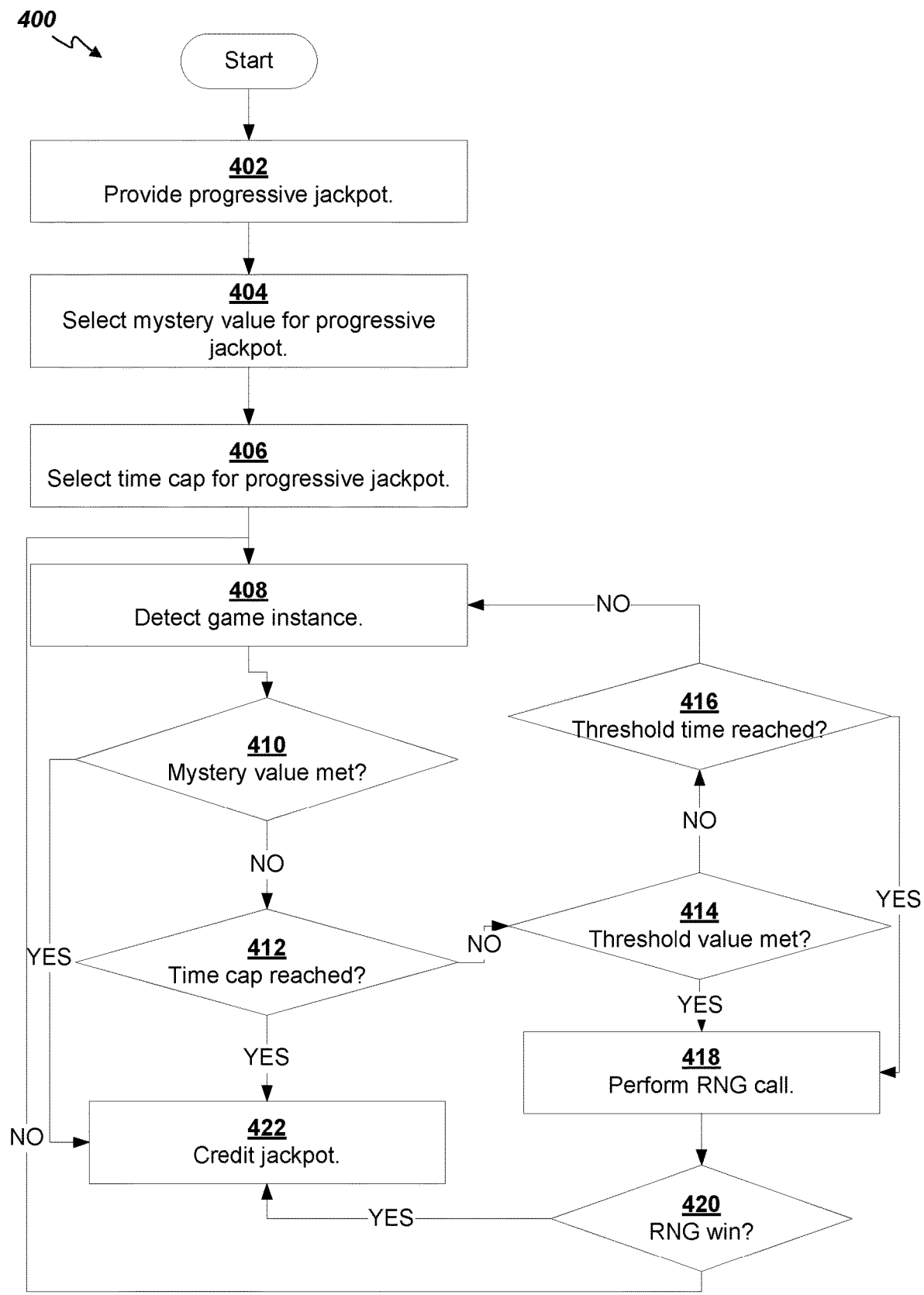
FIG. 4 is a flowchart illustrating an example process flow of an example progressive jackpot, in which the progressive jackpot is evaluated based in part on a time cap in accordance with the present disclosure.

FIG. 4 is a flowchart illustrating an exemplary process flow 400 of an example mystery value progressive jackpot that may be performed by system 100 (shown in FIG. 1), in which the mystery value progressive jackpot is evaluated based in part on a time cap. System 100 may provide the mystery value progressive jackpot (step 402). The progressive jackpot includes parameters such as, for example, parameters relating to the selection of a mystery value and/or a time cap (sometimes referred to herein as "mystery value parameters" and "time cap parameters," respectively). A value of the progressive jackpot may be incremented in response to a player wager (e.g., a game instance). The progressive jackpot may be awarded in response to the first occurrence of either (1) the value of the progressive jackpot reaching the selected mystery value; or (2) the selected time cap being reached. In some embodiments, the progressive jackpot may have a plurality of tiers, each of the tiers having a corresponding mystery value and time cap. In such embodiments, each tier may be analyzed separately (e.g., according to a respective process flow 400).

In response to initiating the progressive jackpot, system 100 selects a mystery value at which the progressive jackpot is to be awarded based on the mystery value parameters (step 404). In some embodiments, the mystery value may be selected from within a mystery value range, for example, using an RNG (e.g., gaming RNG 318 and/or non-gaming RNGs 319A-319N). In some embodiments, the mystery value may be awarded after the value of the progressive jackpot reaches a value threshold, and may be awarded prior to the value of the jackpot reaching the selected mystery value. The value threshold may correspond to, for example, a minimum value of the mystery value range. In some embodiments, the minimum and/or maximum mystery values may be selected from within the mystery range using an RNG (e.g., gaming RNG 318 and/or non-gaming RNGs 319A-319N). As such, a median mystery value may be selected to, for example, cause the progressive jackpot to be awarded from within the mystery value range.

Further in response to initiating the progressive jackpot, system 100 selects a time cap at which the progressive jackpot is to be awarded based on the time cap parameters (step 406). As with respect to the mystery value, in some embodiments, the time cap may be selected from within a time cap range using an RNG (e.g., gaming RNG 318 and/or non-gaming RNGs 319A-319N). In some embodiments, the progressive jackpot may be awarded after a time threshold has been reached, and may be awarded prior to or upon the selected time cap being reached. The time threshold may correspond to, for example, a minimum time value of the time cap range. As such, a median time cap may be selected to, for example, cause the time cap to be awarded during the time cap range. In some embodiments, the time cap, time threshold, and/or time cap range may be defined as a time duration from, for example, the initiation of the progressive jackpot and/or the selection of the time cap. Additionally or alternatively, in some embodiments, the time cap may be defined as a calendar time (e.g., a date time). For example, the time cap parameters may specify that the progressive jackpot be awarded between 10 p.m. and 11 p.m. on a certain weeknight.

System 100 detects a game instance (step 408), for example, by detecting a player wager at one of gaming devices 104A-104X. In response to detecting a game instance, system 100 determines whether the accumulated value of the progressive jackpot has reached the mystery value by comparing the accumulated value to the selected mystery value (step 410). In response to a determination that the mystery value has not been reached, system 100 determines whether the selected time cap has been reached (step 412), for example, by comparing a system clock and/or timer to the time cap. If either the time cap or mystery value has been reached, the progressive jackpot is automatically awarded, as described below.

If the time cap and the mystery value have not been reached, system 100 determines whether the accumulated value of the progressive jackpot has reached the value threshold by comparing the accumulated value to the selected mystery value (step 414). In response to a determination that the value threshold has not been reached, system 100 determines whether the time threshold has been reached (step 416), for example, by comparing a system clock and/or timer to the time threshold. If either the value threshold or the time threshold has been reached, system 100 performs an RNG call to determine whether to award the progressive jackpot, as described below. If the value threshold and time threshold have not yet been reached, the progressive jackpot is not awarded, and system 100 proceeds to stand by until another game instance is detected.

In response to either a determination that the value threshold of the progressive jackpot has been reached or that the time threshold has been reached, system 100 enables a RNG call (e.g., using gaming RNG 318 and/or non-gaming RNGs 319A-319N) to be performed in response to the game instance (step 418). The outcome of the RNG call may be used to determine that the progressive jackpot should be awarded (e.g., if the RNG outcome matches a predefined value or range of values) (step 420), as described below. If the outcome of the RNG call does not indicate that the progressive jackpot should be awarded (e.g., the RNG outcome does not match the predefined value or range of values), system 100 proceeds to stand by until another game instance is detected.

In response to either a determination that the value of the progressive jackpot has reached the mystery value, the time cap has been reached, or the RNG outcome indicates that the progressive jackpot should be awarded, system 100 awards the progressive jackpot (step 422). For example, if the time cap or the mystery value has been reached, system 100 may select a pay table that automatically causes the value of the progressive jackpot to be awarded. In some embodiments, the progressive jackpot is awarded to a gaming device 104A-104X that was the source of the game instance triggering the determination that the progressive jackpot should be awarded. In other words, the progressive jackpot may be awarded to the first game instance that occurred upon either the mystery value or the time cap being reached. Additionally or alternatively, the progressive jackpot may be awarded to any active gaming device 104A-104X upon a determination that the progressive jackpot should be awarded. For example, in some embodiments, system 100 may determine which gaming devices 104A-104X are active upon either the time cap or the mystery value being reached, and select (e.g., using gaming RNG 318 and/or non-gaming RNGs 319A-319N) one of the active gaming machines 104A-104X to award the progressive jackpot.

Figure 5:
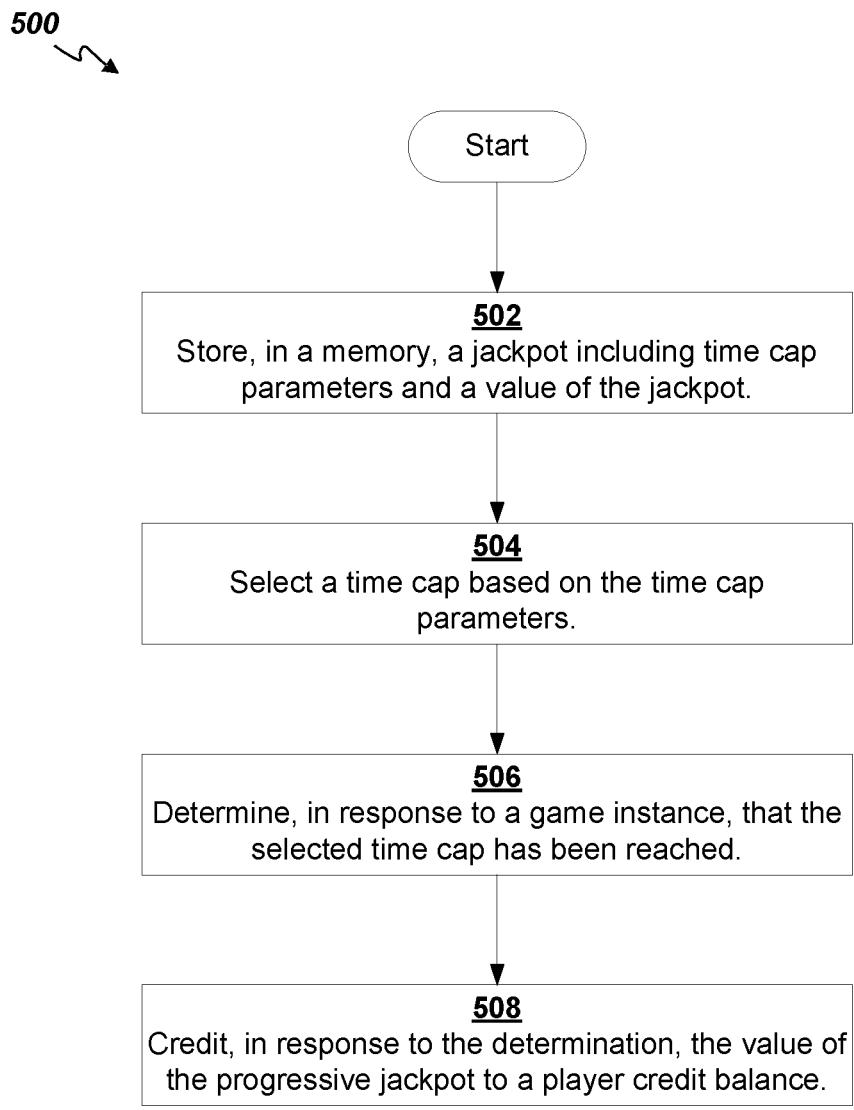
FIG. 5 is a flowchart illustrating an example process flow of an example progressive jackpot in which the progressive jackpot is evaluated based in part on a time cap, as described more generally in FIG. 4.

FIG. 5 is a flowchart illustrating an exemplary process flow 500 of an example jackpot that may be formed by system 100 (shown in FIG. 1), in which the jackpot is evaluated based in part on a time cap. As described above, the jackpot may be, for example, a mystery value progressive jackpot, and may represent a single stand-alone jackpot or one tier of a multi-tier jackpot.

System 100 stores a jackpot in memory 208 (step 502). The jackpot may have time cap parameters, such as a time cap range, as described above with respect to FIG. 4. In some embodiments, the jackpot is a progressive jackpot, and a value of the progressive jackpot may be incremented in response to a player wager (e.g., a game instance at gaming device 104A-104X). Alternatively, the value of the jackpot may be a fixed sum, a state-dependent amount (e.g., dependent on a range of accumulated wagers), and/or another prize (e.g., a vehicle or a travel vacation). In some embodiments, the time cap parameters may include a time cap range during which the progressive jackpot may be awarded and/or the time cap may be selected. For example, once a time threshold has been reached, and prior to the time cap being reached, an RNG call may be performed (e.g., using gaming RNG 318 and/or non-gaming RNGs 319A-319N) in response to game instances, and the progressive jackpot may be awarded based on the outcome of the RNG call. As described below, the progressive jackpot may automatically be awarded upon the time cap being reached. In some embodiments, the time cap may be selected using an RNG (e.g., gaming RNG 318 and/or non-gaming RNGs 319A-319N), for example, from within the time cap range specified by the time cap parameters. In some embodiments, the time cap may be defined as a time duration from, for example, the initiation of the progressive jackpot and/or the selection of the time cap. Additionally, or alternatively, in some embodiments, the time cap may be defined as a calendar time (e.g., a date time). For example, the time cap parameters may specify that the time cap be selected between 10 p.m. and 11 p.m. on a certain weeknight.

In some embodiments, the jackpot is a mystery value progressive jackpot. As described above, a mystery value progressive jackpot is a progressive jackpot that may be awarded when a value accumulated in response to player wagers reaches a specified range and/or value, for example, a mystery value. In such embodiments, the progressive jackpot may include mystery value parameters based on which the mystery value is selected, such as, for example, a mystery value range from which the mystery value may be selected using an RNG (e.g., RNG 318 and/or non-gaming RNGs 319A-319N). In some embodiments, when the progressive jackpot value greater than a threshold value, an RNG call is performed (e.g., using gaming RNG 318 and/or non-gaming RNGs 319A-319N) in response to each game instance to determine whether the progressive jackpot should be awarded. In such embodiments, the jackpot amount may be awarded after the value of the progressive jackpot reaches the threshold value specified by the mystery value parameters, and may be automatically awarded upon reaching the mystery value.

System 100 may select the time cap based on the time cap parameters (step 504). For example, in some embodiments, the time cap parameters may include a time cap range from which the time cap may be selected. In such embodiments, system 100 may select the time cap from within the time cap range using, for example, an RNG (e.g., RNG 318 and/or non-gaming RNGs 319A-319N). In some embodiments, the time cap parameters may include an average time cap, and system 100 may select the time cap based in part on the average time cap, such that a set of selected time cap values may have the specified average time cap as a median value.

In response to a game instance, system 100 may determine, that the time cap has been reached (step 506). For example, system 100 may compare a current time on a system clock and/or timer to the selected time cap.

In response to the determination that the time cap has been reached, system 100 may award the jackpot (step 508). For example, if the time cap or the mystery value has been reached, system 100 may select a pay table that automatically causes the value of the jackpot to be awarded. In some embodiments, the progressive jackpot is awarded to a gaming device 104A-104X that was the source of the game instance triggering the determination that the progressive jackpot should be awarded. In other words, the progressive jackpot may be awarded to the first game instance that occurred upon either the mystery value or the time cap being reached. Additionally or alternatively, the progressive jackpot may be awarded to any active gaming device 104A-104X upon a determination that the progressive jackpot should be awarded. For example, in some embodiments, system 100 may determine which gaming devices 104A-104X are active upon either the time cap or the mystery value being reached, and select (e.g., using gaming RNG 318 and/or non-gaming RNGs 319A-319N) one of the active gaming machines 104A-104X to award the progressive jackpot.

Figure 6:
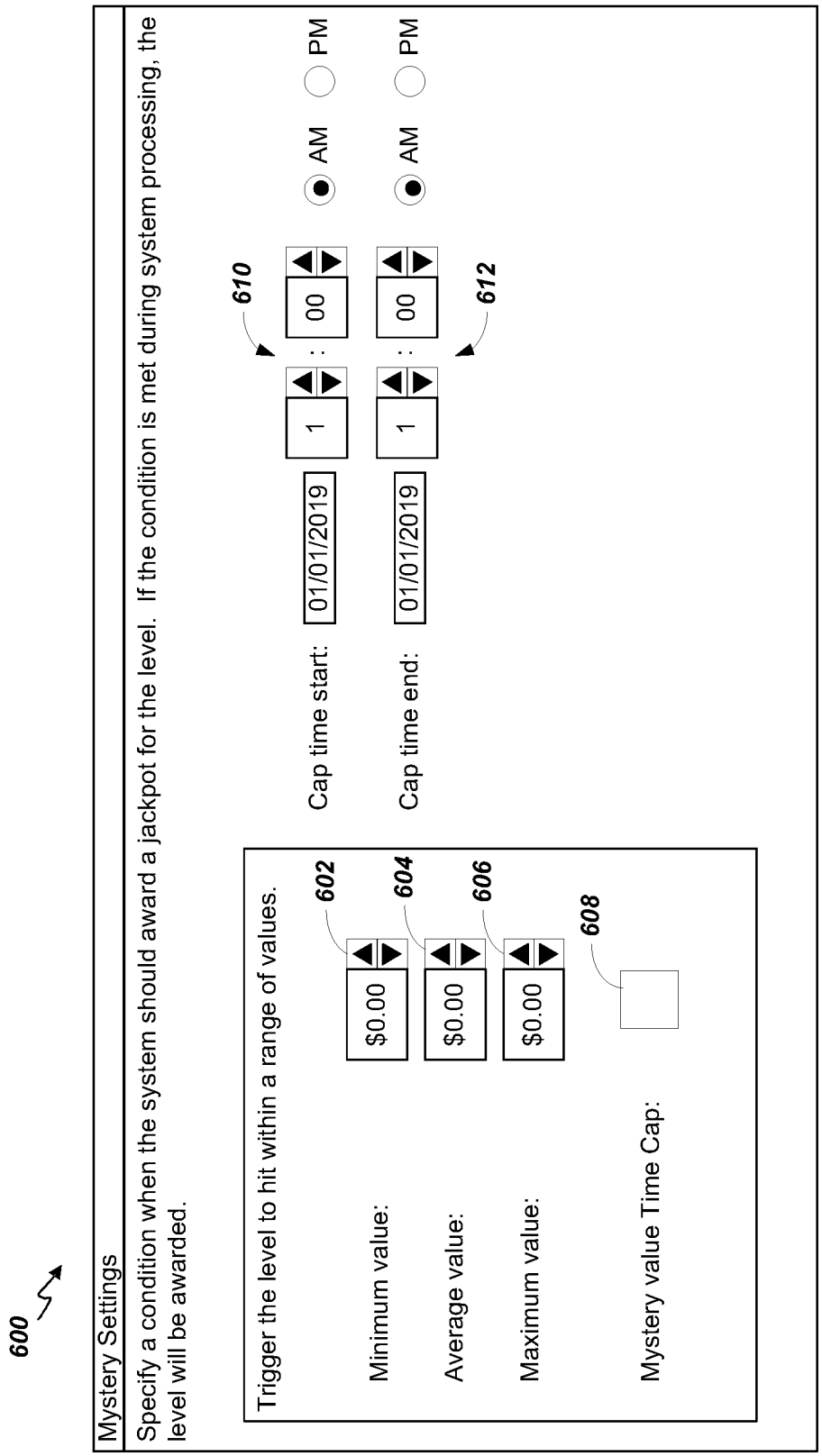
FIG. 6 is a screenshot of an example user interface for configuring the progressive jackpot described in FIG. 4.

FIG. 6 is a screenshot of an example user interface 600 for configuring the progressive jackpot described in FIG. 4. User interface 600 may be displayed, for example, by one or more components of system 100 (shown in FIG. 1), such as by player tracking system server 110, progressive system server 112, casino management system server 114, and gaming devices 104A-104X. User interface 600 enables a user, such as a game operator, to select mystery value parameters using minimum value field 602, average value field 604, and maximum value field 606. Minimum value field 602, average value field 604, and maximum value field 606 may be used to select a minimum mystery value, an average mystery value, and a maximum mystery value, respectively. A mystery value of the progressive jackpot may be selected (e.g., using RNG 318 and/or non-gaming RNGs 319A-319N) from a range of values (e.g., a mystery value range) between the minimum mystery value and maximum mystery value specified by respective minimum value field 602 and maximum value field 606. The mystery value may be selected further based on the average mystery value specified by average value field 604. For example, the average value may be adhered to over one million RNG calls, and may be selected via an RNG mechanism (e.g., RNG 318 and/or non-gaming RNGs 319A-319N).

When time cap checkbox 608 is checked, a time cap of the progressive jackpot is enabled, and time cap parameters may be selected using cap start time field 610 and cap end time field 612. A time cap may be selected (e.g., using RNG 318 and/or non-gaming RNGs 319A-319N) from within a range (e.g., a time cap range) of date times between a start time and an end time specified by cap start time field 610 and cap end time field 612.

Thus, a system and method for evaluating a progressive jackpot such as a mystery value progressive jackpot is provided. In at least some embodiments, a progressive jackpot includes a time cap. In response to a game instance, a determination is made whether the time cap has been reached, and if it has, the progressive jackpot is automatically awarded regardless of whether other parameters for winning the jackpot have been met. As such, the frequency with which and time at which the progressive jackpot is awarded may be controlled independently of other factors, such as, for example, a rate at which wagers are accumulated for the jackpot.

A gaming system for evaluating a progressive jackpot using a time cap may be provided. The system includes a processor and a memory, wherein the processor is configured to execute instructions stored in the memory which when executed, cause the processor to at least store, in the memory, a progressive jackpot including time cap parameters and a value of the progressive jackpot, wherein the value of the progressive jackpot is incremented in response to a player wager. The instructions, when executed, further cause the processor to select a time cap based on the time cap parameters. The instructions, when executed, further cause the processor to determine, in response to a game instance, that the selected time cap has been reached. The instructions, when executed, further cause the processor to credit, in response to the determination, the value of the progressive jackpot to a player credit balance.

In some embodiments, the progressive jackpot further includes a time threshold, and the instructions further cause the processor to: determine, in response to a game instance, that the time threshold has been reached; enable, in response to the determination that the time threshold has been reached, a progressive jackpot random number generator (RNG) call to be triggered; and credit, in response to an outcome of the progressive jackpot RNG call, the value of the progressive jackpot to a player credit balance.

In some embodiments, the time cap parameters include a time cap range. In some such embodiments, to select the time cap, the instructions cause the processor to select the time cap from within the time cap range using an RNG.

In some embodiments, the progressive jackpot is a mystery value progressive jackpot including mystery value parameters, and the instructions further cause the processor to: select a mystery value based on the mystery value parameters; determine, in response to a game instance, that the value of the progressive jackpot has reached the mystery value; and credit, in response to the determination that the value of the progressive jackpot has reached the mystery value, the value of the progressive jackpot to a player credit balance. In some such embodiments, the mystery value progressive jackpot further includes a mystery value threshold, and the instructions further cause the processor to: determine, in response to a game instance, that the value of the progressive jackpot has reached the mystery value threshold; enable, in response to the determination that the value of the progressive jackpot has reached the mystery value threshold, an progressive jackpot random number generator (RNG) call to be triggered; and credit, in response to an outcome of the progressive jackpot RNG call, the value of the progressive jackpot to a player credit balance. In some such embodiments, to select the mystery value, the instructions cause the processor to select the mystery value using an RNG.

In some embodiments, the time cap corresponds to at least one of a calendar time and a time duration from an initiation of the progressive jackpot.

In some embodiments, to credit the value of the progressive jackpot to the player credit balance, the instructions cause the processor to determine which of a plurality of electronic gaming machines are active; and select, using a random number generator, a player credit balance associated with an active electronic gaming machine to credit the progressive jackpot.

In some embodiments, the progressive jackpot includes a plurality of tiers, each of the plurality of tiers including corresponding time cap parameters and time caps.

A method for evaluating a progressive jackpot using a time cap may be provided. The method includes storing, in a memory, a progressive jackpot including time cap parameters and a value of the progressive jackpot, wherein the value of the progressive jackpot is incremented in response to a player wager. The method further includes selecting a time cap based on the time cap parameters. The method further includes determining, in response to a game instance, that the time cap has been reached. The method further includes crediting, in response to the determination, the value of the progressive jackpot to a player credit balance.

In some embodiments, the progressive jackpot further includes a time threshold, and the method further includes: determining, in response to a game instance, that the time threshold has been reached; enabling, in response to the determination that the time threshold has been reached, a progressive jackpot random number generator (RNG) call to be triggered; and crediting, in response to an outcome of the progressive jackpot RNG call, the value of the progressive jackpot to a player credit balance.

In some embodiments, the time cap parameters include a time cap range. In some such embodiments, selecting the time cap comprises selecting the time cap from within the time cap range using an RNG.

In some embodiments, the progressive jackpot is a mystery value progressive jackpot including mystery value parameters, and the method further includes: selecting a mystery value based on the mystery value parameters; determining, in response to a game instance, that the value of the progressive jackpot has reached the mystery value; and crediting, in response to the determination that the value of the progressive jackpot has reached the mystery value, the value of the progressive jackpot to a player credit balance. In some such embodiments, the mystery value progressive jackpot further includes a mystery value threshold, and the method further includes: determining, in response to a game instance, that the value of the progressive jackpot has reached the mystery value threshold; enabling, in response to the determination that the value of the progressive jackpot has reached the mystery value threshold, an progressive jackpot random number generator (RNG) call to be triggered; and crediting, in response to an outcome of the progressive jackpot RNG call, the value of the progressive jackpot to a player credit balance. In some such embodiments, selecting the mystery value includes selecting the mystery value using an RNG.

In some embodiments, the time cap corresponds to at least one of a calendar time and a time duration from an initiation of the progressive jackpot.

In some embodiments, crediting the value of the progressive jackpot to a player credit balance includes determining which of a plurality of electronic gaming machines are active; and selecting, using a random number generator, a player credit balance associated with an active electronic gaming machine to credit the progressive jackpot.

In some embodiments, the progressive jackpot includes a plurality of tiers, each of the plurality of tiers including corresponding time cap parameters and time caps.

A method for evaluating a jackpot using a time cap may be provided. The method includes storing, in a memory, a jackpot including time cap parameters and a value of the jackpot. The method further includes selecting a time cap based on the time cap parameters. The method further includes determining, in response to a game instance, that the selected time cap has been reached. The method further includes crediting, in response to the determination, the value of the jackpot to a player credit balance.

A non-transitory computer-readable media having computer-executable instructions embodied thereon may be provided. When executed by a gaming system including a processor and a memory, the computer-executable instructions cause the processor to at least store, in the memory, a jackpot including time cap parameters and a value of the jackpot. The instructions, when executed, further cause the processor to select a time cap based on the time cap parameters. The instructions, when executed, further cause the processor to determine, in response to a game instance, that the selected time cap has been reached. The instructions, when executed, further cause the processor to credit, in response to the determination, the value of the progressive jackpot to a player credit balance.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming system comprising a processor and a memory, the processor in communication with a plurality of gaming devices and a display device, wherein the processor is configured to execute instructions stored in the memory which when executed, cause the processor to at least:
store, in the memory, a value of a jackpot, wherein the value of the jackpot is increased in response to game instances at the plurality of gaming devices;

provide content configured to cause the display device to display a user interface including a value cap parameter field;

receive a selection of value cap parameters including a minimum value and a maximum value through the value cap parameter field, the minimum value and the maximum value defining a value cap range;

select a value cap from within the value cap range using a random number generator (RNG);

monitor gameplay at the plurality of gaming devices to determine that the jackpot has not yet been awarded;

determine, in response to a game instance, that the selected value cap is met; and credit, in response to the determination that the jackpot has not yet been awarded and the determination that the selected value cap is met, the value of the jackpot to a player credit balance.

2. The gaming system of claim 1, wherein the user interface further includes a time cap parameter field, and wherein the processor is further configured to:

receive a selection of time cap parameters through the time cap parameter field of the user interface, the time cap parameters including a time cap range defined by a start time and an end time;

select a time cap based on the selected time cap parameters, the time cap selected from within the time cap range using an RNG;

determine, in response to the game instance, that the value of the time cap is met; and credit, in response to the determination that the time cap is met, the value of the jackpot to the player credit balance.

3. The gaming system of claim 1, wherein the processor is further configured to:

store, in the memory, a value threshold;

determine, in response to a game instance, that the value threshold has been satisfied;

enable, in response to the determination that the value threshold has been reached, a jackpot RNG call to be triggered; and credit, in response to an outcome of the jackpot RNG call, the value of the jackpot to a player credit balance.

4. The gaming system of claim 1, wherein the processor is further configured to select, in response to the determination that the selected value cap has been met, a pay table that causes the value of the jackpot to automatically be credited to the player credit balance.

5. The gaming system of claim 1, wherein the processor is further configured to:

determine which of the plurality of gaming devices are active; and select, based on an RNG output, a player credit balance associated with an active gaming device to credit the jackpot.

6. The gaming system of claim 1, wherein the selection of the value cap parameters through the value cap parameter field of the user interface is received from a game operator.

7. The gaming system of claim 1, wherein the plurality of gaming devices includes at least one mobile device.

8. A method performed by a gaming system including a processor and a memory, the processor in communication with a plurality of gaming devices and a display device, the method comprising:

storing, in the memory, a value of a jackpot, wherein the value of the jackpot is increased in response to game instances at the plurality of gaming devices;

providing content configured to cause the display device to display a user interface including a value cap parameter field;

receiving a selection of value cap parameters including a minimum value and a maximum value through the value cap parameter field, the minimum value and the maximum value defining a value cap range;

selecting a value cap from within the value cap range using a random number generator (RNG);

monitoring gameplay at the plurality of gaming devices to determine that the jackpot has not yet been awarded;

determining, in response to a game instance, that the selected value cap is met; and crediting, in response to the determination that the jackpot has not yet been awarded and the determination that the selected value cap is met, the value of the jackpot to a player credit balance.

9. The method of claim 8, wherein the user interface further includes a time cap parameter field, and wherein the method further comprises:

receiving a selection of time cap parameters through the time cap parameter field of the user interface, the time cap parameters including a time cap range defined by a start time and an end time;

selecting a time cap based on the selected time cap parameters, the time cap selected from within the time cap range using an RNG;

determining, in response to the game instance, that the value of the time cap is met; and crediting, in response to the determination that the time cap is met, the value of the jackpot to the player credit balance.

10. The method of claim 8, further comprising:

storing, in the memory, a value threshold;

determining, in response to a game instance, that the value threshold has been satisfied;

enabling, in response to the determination that the value threshold has been reached, a jackpot RNG call to be triggered; and crediting, in response to an outcome of the jackpot RNG call, the value of the jackpot to a player credit balance.

11. The method of claim 8, further comprising selecting, in response to the determination that the selected value cap has been met, a pay table that causes the value of the jackpot to automatically be credited to the player credit balance.

12. The method of claim 8, further comprising:

determining which of the plurality of gaming devices are active; and selecting, based on an RNG output, a player credit balance associated with an active gaming device to credit the jackpot.

13. The method of claim 8, wherein the selection of the value cap parameters through the value cap parameter field of the user interface is received from a game operator.

14. The method of claim 8, wherein the plurality of gaming devices includes at least one mobile device.

15. A non-transitory computer-readable storage media having computer-executable instructions embodied thereon, wherein when executed by a processor in communication with a memory, a plurality of gaming devices, and a display device, the computer-executable instructions cause the processor to at least:

store, in the memory, a value of a jackpot, wherein the value of the jackpot is increased in response to game instances at the plurality of gaming devices;

provide content configured to cause the display device to display a user interface including a value cap parameter field;

receive a selection of value cap parameters including a minimum value and a maximum value through the value cap parameter field, the minimum value and the maximum value defining a value cap range;

select a value cap from within the value cap range using a random number generator RNG);

monitor gameplay at the plurality of gaming devices to determine that the jackpot has not yet been awarded;

determine, in response to a game instance, that the selected value cap is met; and credit, in response to the determination that the jackpot has not yet been awarded and the determination that the selected value cap is met, the value of the jackpot to a player credit balance.

16. The non-transitory computer-readable media of claim 15, wherein the user interface further includes a time cap parameter field, and wherein the computer-executable instructions further cause the processor to:

receive a selection of time cap parameters through the time cap parameter field of the user interface, the time cap parameters including a time cap range defined by a start time and an end time;

select a time cap based on the selected time cap parameters, the time cap selected from within the time cap range using an RNG;

determine, in response to the game instance, that the value of the time cap is met; and credit, in response to the determination that the time cap is met, the value of the jackpot to the player credit balance.

17. The non-transitory computer-readable media of claim 15, wherein the plurality of gaming devices includes at least one mobile device.

* * * * *